United States Patent [19]
Kirkland

[11] 4,021,725
[45] May 3, 1977

[54] MOBILE MINE DETECTION SYSTEM HAVING PLURAL COLOR DISPLAY

[75] Inventor: James L. Kirkland, Panama City, Fla.

[73] Assignee: The United States of America as represented by the Secretary of the Navy, Washington, D.C.

[22] Filed: Mar. 5, 1976

[21] Appl. No.: 664,223

[52] U.S. Cl. .................................... 324/3; 324/8
[51] Int. Cl.² .................................... G01V 3/08
[58] Field of Search .................... 324/1, 3–9, 324/.5 E

[56] References Cited
UNITED STATES PATENTS

| | | | |
|---|---|---|---|
| 2,378,440 | 6/1945 | Scott | 324/9 X |
| 2,777,112 | 1/1957 | Coker et al. | 324/8 |
| 2,902,636 | 9/1959 | Coker et al. | 324/8 |
| 2,974,276 | 3/1961 | Davis | 324/9 X |
| 3,361,957 | 1/1968 | Hings | 324/9 X |
| 3,942,101 | 3/1976 | Sayer et al. | 324/7 X |

*Primary Examiner*—Gerard R. Strecker
*Attorney, Agent, or Firm*—Richard S. Sciascia; Don D. Doty; Harvey A. David

[57] ABSTRACT

A vehicle carried metal object sensing system wherein sensing of magnetic fields of different polarity or of ferrous and non-ferrous objects results in distinctive colors on a cathode ray tube display. Deflection signals are generated in accordance with vehicle travel and field scan to provide successive frames of a map-like display.

10 Claims, 7 Drawing Figures

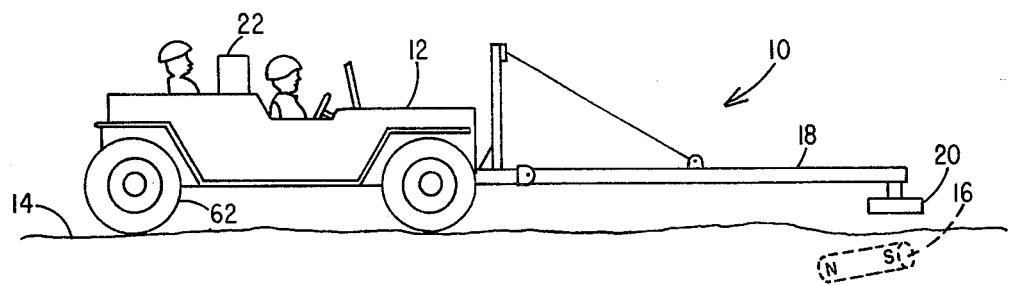
Fig. 1
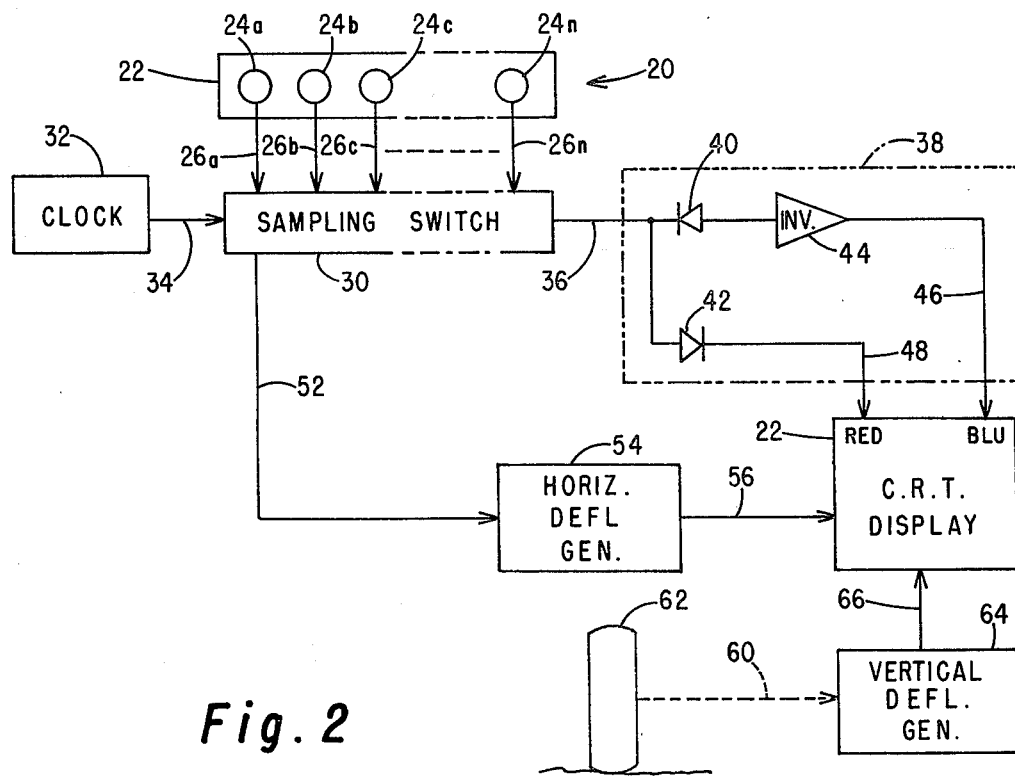
Fig. 2
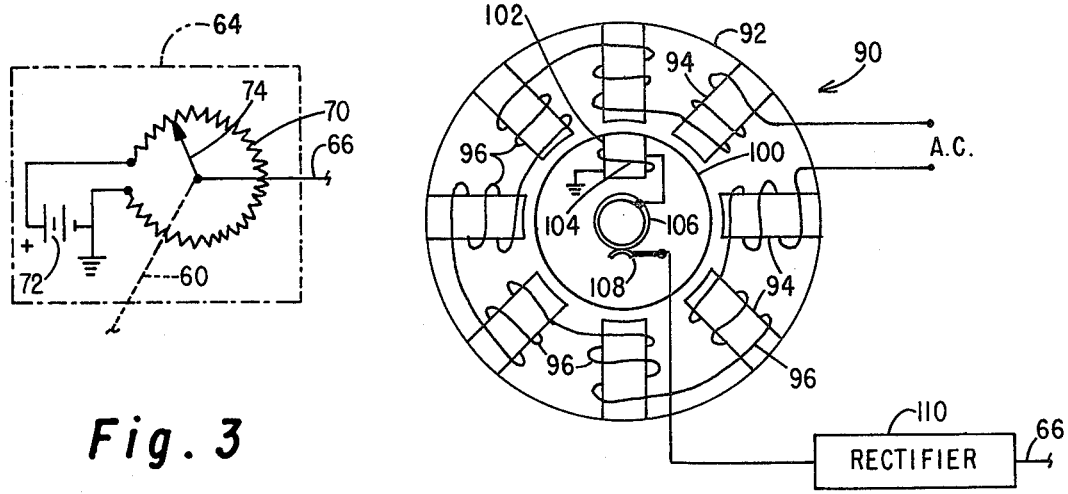
Fig. 3
Fig. 4

MOBILE MINE DETECTION SYSTEM HAVING PLURAL COLOR DISPLAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to the detection and classification of metal objects such as buried explosive mines in a minefield, and more particularly to an improved mine detection and display system in combination with an automotive vehicle.

Various methods and apparatus for the detection of land mines have been employed and proposed. These have included a variety of sensors such as magnetometers, electromagnetic transmitters and receivers, sonic devices, using electron paramagnetic resonance signals, and other sensors. Systems using such sensors have demonstrated that mine detection is feasible, however the signals generated have generally been difficult to interpret and accordingly the degree of success has varied considerably with the skill of the operator.

In the case of portable instruments, the signals are usually delivered to earphones and vary in pitch or intensity and the operator classifies the detection on this basis, using experience as a guide. A method that has been tried, in an effort to avoid reliance on audible interpretation, records voltage values in numerical form on a paper tape and the operator converts the numbers mentally into somewhat of an "image." Still another method is to record the analog value of the signal in the form of a "signature" trace on paper tape and having the operator interpret the shape and intensity variations, as well as the signal polarity, to classify the signal recorded as to location, depth, size, etc. of a detected object. The foregoing methods operate essentially in real time and allow a classification to be made as a mine search progresses.

The principal objection to the methods cited is the difficulty in analyzing and interpreting the audible or recorded signals. In the case of audible signals from a total field magnetometer, the type best suited for detecting the ferrous components of a land mine, no distinction can be made by the operator as to magnetic polarity. Inasmuch as magnetic polarity induced by the earth's magnetic field can be of considerable value in classifying a detected object as to size, shape, and particularly orientation, the use of audible interpretation is severely limited. The use of paper strip recorders, while giving some indications of polarity, are dificient in presenting a display from which the operator can derive a ready feel of geographic relationship correlating the tracing to the area being searched.

SUMMARY OF THE INVENTION

The present invention aims to overcome some or all of the disadvantages of the prior at through the provision of an improved display of detection signals in a venicle-carried mine detection system, the display being coordinated automatically with vehicle advance, and yielding more readily interpreted imaging of detected objects.

With the foregoing in mind, it is a primary object of the invention to provide an improved, motorized, land mine detecting or magnetic profile mapping apparatus.

Another object of the invention is to provide a mine detecting apparatus wherein a path of substantial width is scanned according to a predetermined pattern, and the detection or sensing signals are visually displayed in a map-like form that is updated in accordance with advance of the apparatus.

Still another object is the provision of a mine detection and display apparatus of the foregoing character wherein the display is presented on a cathode ray tube.

Yet another important object of the invention is the generation of a cathode ray tube display in a plurality of colors representative of magnetic polarity in the case of total field magnetic sensing, or distinction between ferrous and non-ferrous objects in the case of inductive metal detection.

As another object, the invention aims to provide improved detector scan and display correlation through the use of horizontal and vertical deflection signal generators responsive to wheel motion of the supporting vehicle and sweep or scan of the sensing element of the apparatus or system.

Other objects and many of the attendant advantages will be readily appreciated as the subject invention becomes better understood by reference to the following detailed description, when considered in conjunction with the accompanying drawings.

DESCRIPTION OF THE DRAWINGS

FIG. 1 is a side elevational view of a mine detecting apparatus embodying the invention;

FIG. 2 is a diagrammatic illustration, in block form, of the apparatus of FIG. 1;

FIG. 3 is a diagrammatic illustration of a vertical deflection generator component of the apparatus;

FIG. 4 is a diagrammatic illustration of an alternative vertical deflection generator;

DESCRIPTION OF THE PREFERRED EMBODIMENT

Figure 5:
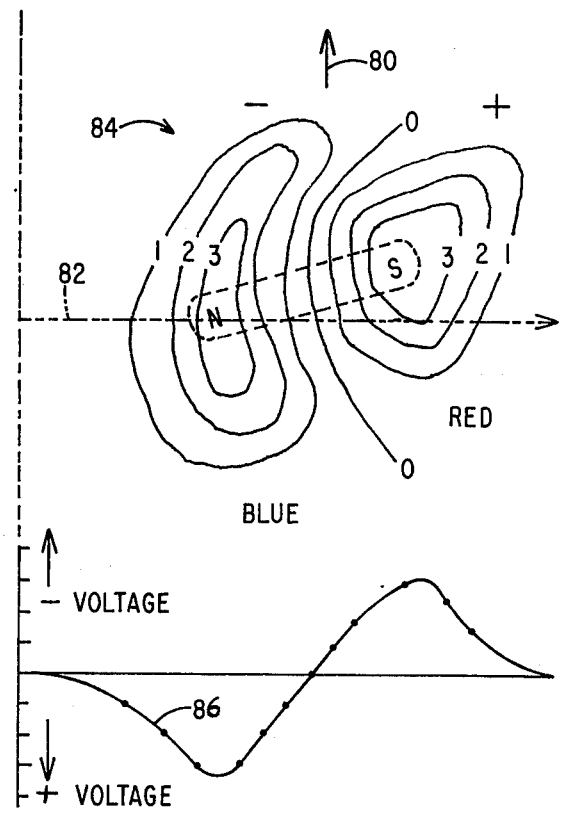
FIG. 5 is a graphic illustraion of a magnetic field around an object and an analog voltage signal derived from that magnetic field.

In the form of the invention illustrated in FIG. 1, a mine detection apparatus 10 comprises an automotive vehicle 12, adapted to traverse the surface of a minefield 14 in which objects, such as an explosive mine 16 having ferrous components, are buried. Mounted on the front of the vehicle 12 is a boom 18, a the outer end of which is carried a total field magnetic sensor array 20, later described in more detail. Carried in the vehicle 12 is a multiple color display unit 22 on which detection information is presented, in a manner which will be described as this specification proceeds, to an operator riding in the vehicle.

Referring now to FIG. 2, sensor array 20 comprises an array made up of a plurality of individual total field magnetic sensors 24a, 24b, 24c . . . 24n arranged in a row across the path of travel 26 of the vehicle 12. The sensors 24a, 24b, 24c . . . 24n in this exemplary embodiment advantageously are of the type known as a cesium vapor magnetometer, and which are commercially available, for example from Varian Associates, Inc. of Palo Alto, California. Such sensors are capable of providing an output in the form of an analog voltage wherein positive values may be taken as representative of positive magnetic field strengths around a magnetic south pole, and negative values may be taken as representative of negative magnetic field strengths around a north magnetic pole.

The analog voltage outputs of the sensors 24a, 24b, 24c . . . 24n of the sensor array 20 are fed as shown by lines 26a, 26b, 26c . . . 26n to a sampling switch 30. Switch 30 may be of mechanical construction, but is preferably of the slid state electronic type. Clock means 32 provides clocking signals, as shown by line 34, for driving the sampling switch 30 so that the sampling switch provides a series of analog voltage values, represented by line 36, to a polarity detector 38.

Polarity detector 38 conveniently comprises oppositely oriented rectifiers 40 and 42 connected to receive incoming analog signal samples from sampling switch 30. Rectifier 40 is connected through an inverter 44 to provide polarity detector outputs on line 46 corresponding to negative sample voltages and negative magnetic field polarities sensed by magnetic sensor array 20. Rectifier 42 is connected to provide polarity detector outputs on line 48 corresponding to positive sample voltages and positive magnetic field polarities sensed by the magnetic sensor array, The outputs of polarity detector 38 are connected, as shown by lines 46, 48 to the blue and the red inputs, respectively, of the plural color cathode ray tube display unit 22, for the purpose of modulating the intensities of the blue and red producing electron beam generation thereof in accordance with the degree of magnetic effect of ferrous objects on the sensors 24a, 24b, 24c, . . . 24n.

A sync signal, generated by sampling switch 30, is applied as shown by line 52 to a horizontal deflection signal generator 54. Horizontal deflection signal generator 54 conveniently comprises a conventional sawtooth waveform electrical signal generator and provides such a signal, as shown by line 56 to the horizontal deflection means of display unit 22.

Connected, as shown by dotted line 60, to a wheel 62 of vehicle 12 is a vertical deflection signal generator 64. Generator 64 is driven by rotation of wheel 62 as the vehicle 12 moves along a predetermined path and serves to generate a sawtooth voltage signal that is applied via line 66 to the vertical deflection means of display unit 22. Referring to FIG. 3 vertical signal generator 64 conveniently comprises a potentiometer 70 connected across a suitable voltage source 72 and having a wiper 74 driven in accordance with forward movement of the vehicle.

MODE OF OPERATION

Referring additionally now to FIG. 5, consider vehicle 12 and detector array 20 to be moving slowly over a minefield in the direction indicated by arrow 80. Sampling switch 30, under the timing control of clock 32, causes the outputs of the magnetic detector array 20 to be scanned sequentially many times during one wheel revolution of forward travel of the vehicle. Dot and dash line 82 represents one such scan as it crosses the magnetic field of influence 84 of a buried object or mine 16 having magnetic polarities as indicated. Scanning of the magnetic field, usually measured in gamas, produces varying voltage levels in the output, line 36, of the sampling switch. These voltage levels may be plotted as shown by voltage curve 86 to show relative field strength and polarity. Polarity detector 38 provides rectified and separated voltages on lines 46, 48 that produce corresponding intensities of blue and red to be generated at the face of the display unit 22.

In synchronism with scanning of the sensors 24a, 24b, 24c . . . 24n of the aray 2, horizontal deflection signal generator 54 generates a series of voltage ramps, or a sawtooth waveform, that is applied to the horizontal deflection circuitry of the display unit. As a result, the electron beam of the display is caused to produce one horizontal sweep for each horizontal scan of the magnetic field sensors in aray 20.

Also, as the vehicle 12 proceeds along path 80, rotation of wheel 62 causes vertical deflection signal generator 64 to produce a voltage ramp that is applied to the vertical deflection circuitry of display unit 22. Inasmuch as numerous horizontal scans are made for each revolution of wheel 62, a raster is generated on display unit 22. Because the beam intensity is modulated so as to produce a red or a blue trace depending upon the polarity of magnetic field being sensed, a red, blue, and neutral display image is generated representing the magnetic field in map-like form corresponding to the zone over which array 20 passes with the forward motion of the vehicle. By appropriate selection of the persistance of the cathode ray tube phosphors, the display will produce succeeding frames wherein the sensor array position moves from bottom to top of the display and then repeats. Of course, the coupling of wheel 62 to the vertical deflection generator may be such as to require less than or more than one revolution of the wheel per frame of display, depending upon the degree of resolution and range of coverage desired for a frame.

The resulting two color and variable intensity display permits an operator to readily determine degrees of magnetic field and polarity, as well as size, from which he can deduce characteristics of size, shape, and orientation of the magnetic object giving rise to, or changing the shape of the magnetic field under survey. Additionally, the display provides a feel or appreciation of the geographic location of the object in the search area.

Turning to FIG. 4, indicates generally a vertical deflection signal generator that can be used in place of generator 64. Generator 90 comprises a stator 92, including a plurality of iron cores or pole-pieces 94 carying windings 96 that are energized from a suitable source of alternating current. An armature 100 having a pole-piece 102 carries a winding 104 that is connected through a slip-ring 106 and brush 108 to a rectifier 110. Although for clarity in the illustration the windings 96 appear identical, they are provided with different numbers of turns, conveniently ascending in number going around the stator in the direction of rotation of the rotor. The windings 96 serve as plural primary windings of a transformer, of which winding 104 is the secondary. As the rotor turns an increasing D.C. output voltage in the fom of a sawtooth waveform will be available from rectifier for application via line 66' to the display unit vertical deflection circuitry. A smooth output is obtained by exciting the primaries in phase, with the overlapping magnetic fields between poles being a sum of the individual fields. Of course, the primaries can be arranged in groups and the rotor can be driven at different speeds relative to the advance of the vehicle to provide the desired frame rate and resolution.

Figure 6:
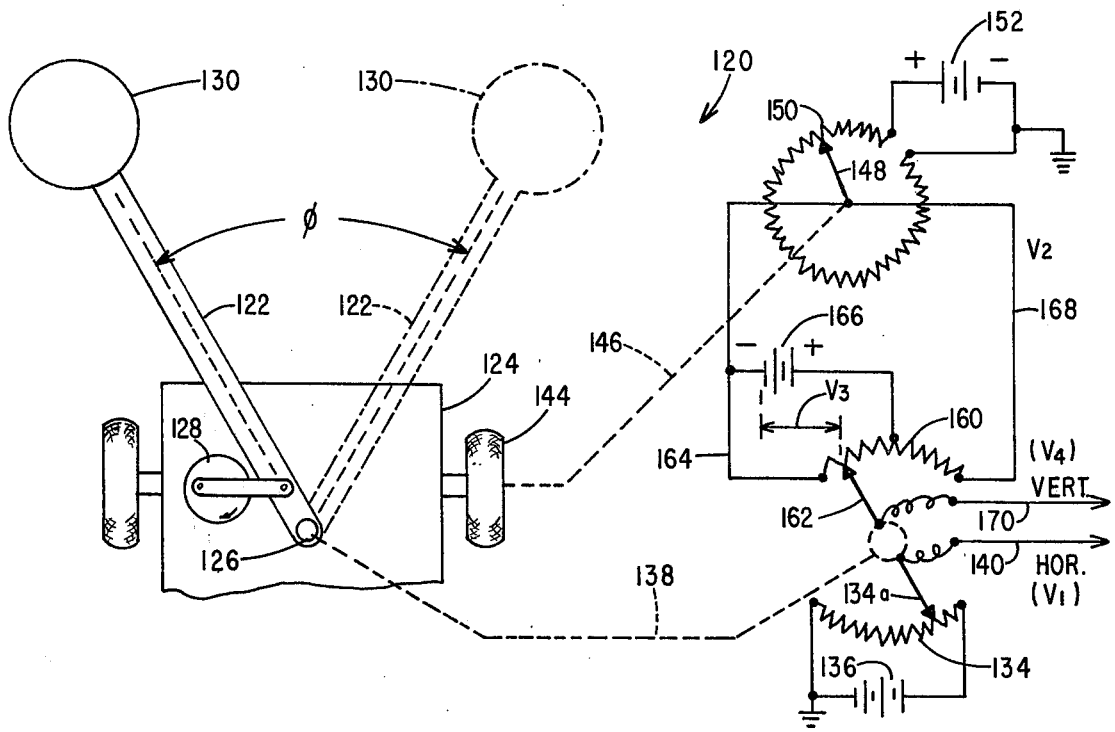
FIG. 6 is a diagrammatic illustration of aother embodiment of the invention.

Referring now to FIG. 6, an alternative vehicle carried mine detection apparatus 120 embodying the invention comprises a boom 122 mounted on vehicle 124 for back and fourth movement about pivot 126, under the influence of an oscillatory eccentric drive means 128, through a predetermined angle φ.

Boom 122 carries a magnetic field sensor 130 at its outer end for reciprocating arcuate scanning sweeps through an angle φ. The drive means 138 conveniently includes a timing motor that determines the rate and frequency of scan, smilar to clock 32 in the system 10. It will be understood that analog voltage outputs from sensor 130 are applied to a polarity detector such as 38 and hence to a display such as unit 22. Vertical deflection signals for the display are derived from a potentiometer 134, energized by a D.C. source 136 and having a wiper 134a coupled as shown by line 138 to the boom. The output of potentiometer 134 is represented by line 140 and will cause the display electron beam to move back and fourth across the display in synchronism with reciprocations of sensor 130.

Vertical deflection signals are generated in response to a combination of vehicle travel and boom and sensor reciprocations so as to cause the display beam scan to follow arcuate paths correspondng to the arcuate excursions of the sensor 130. To this end, a wheel 144 of the vehicle 124 is coupled, as shown at 146 to the wiper 148 of a potentiometer 150. Potentiometer 150 is energized by a D.C. source 152. A second potentiometer 160 has its wiper 162 connected for reciprocation in synchronism with sensor 130. The potentiometer 160 has one end connected through a conductor 164 to the negative termainal of a D.C. source 166 and also to wiper 148 of potentiometer 150. The other end of potentiometer 160 is connected through a conductor 168 to wiper 148. The positive terminal of D.C. source 166 is connected to a center tap of potentiometer 160. It will be noted that the polarities of the D.C. sources 152 and 166 are such that a voltage $V_2$ on wiper 148, as determined by the position of that wiper with vehicle travel, will be added to a voltage $V_3$ existing between the negative terminal of source 166 and wiper 160. The resulting voltage $V_4$ on wiper 162 is applied via line 170 to the vertical deflection circuit of the display.

Figure 7:
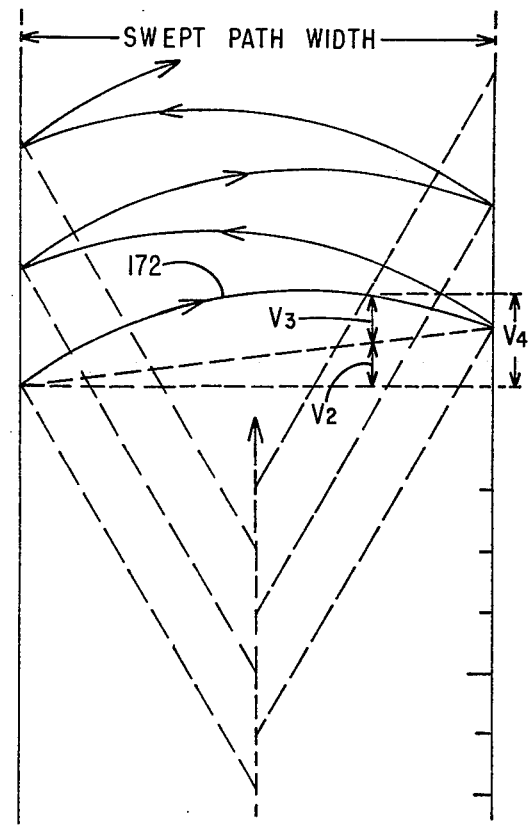
FIG. 7 is a graphic illustration of the sweep pattern and deflection voltage generator of the apparatus of FIG. 6.

Referring to FIG. 7, the combination of voltages $V_2$ and $V_3$ to form $V_4$ results in a curved sweep path 172 of the cathode ray beam so that a raster is generated that corresponds to the actual travel of the sensor 130 over the ground. Of course, the sensor 130 makes numerous back and forth excursions during each frame corresponding to a predetermined amount of forward travel.

If other than total field magnetic sensing is desired, for example where it is desired to determine the presence of, and distinguish between, both ferrous and non-ferrous metal objects, the total field sensor 130 or sensors 24a, 24b, 24c, . . . 24n may be replaced by inductive metal detectors. For example, use may be made of sensors relying on change of phase in a sensor coil relative to an exciter coil wherein the output signal may be in the form of an analog voltage that changes in a first direction, or polarity, to indicate a ferrous object and in a second direction, or polarity, to indicate a non-ferrous metal object. Such an analog voltage, applied then to polarity detector 38, will be separated into signals indicative of ferrous or non-ferrous metals, and the resulting display on display unit 22 will be characterized by a distinctive color for each, thereby rendering object classification more reliable.

In addition to the analog signal processing and display described with reference to the detection systems 10 and 120, acoustic signals may, of course, be also used in the detection and classification of objects.

From the foregoing, it will be appreciated tha the invention have provided a novel detection system wherein the display is in map-like format and is directly related to the motion of the supporting vehicle. Moreover, it will also be recognized that the invention has provided a system that distinguishes between first and second conditions, e.g., between magnetic fields associated with north or with south magnetic poles, or between ferrous and non-ferrous metal objects.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modification and embodiments intended to be included within the scope of the appended claims.

What is claimed is;

1. Detection apparatus operative to distinguish between and generate a plural color display representative of first and second magnetic pole characteristics of metal objects that affect a magnetic field, said apparatus comprising:
    a vehicle adapted for movement along a directed course over a surface beneath which said objects are likely to be disposed;
    magnetic field sensing means, mounted on said vehicle, for generating analog voltage signals of first and second voltage polarity corresponding respectively to said first and second magnetic pole characteristics;
    scanner means, connected to said sensing means, for causing said sensing means to repetitiously effect scanning of said surface transversely of said directed course so as to detect variations in magnetic field in accordance with said magnetic pole characteristics over a scanned area as said vehicle
    first deflection signal generating means, responsive to said movement along a directed course, for generating first deflection signals corresponding to said movement;
    second deflection signal generating means, coupled to said scanner means for generating second deflection signals corresponding to said scaning;
    voltage polarity detector means, coupled to said sensing means, for separating said analog signals into first polarity analog signals and second polarity analog signals representative of said first and second magnetic pole characteristics, respectively; and
    display means, responsive to said first and second polarity analog signals and to said first and second deflection signals, for providing a plural color map-like display of said variations in said first and second magnetic pole characteristics in scaned area of said surface traversed by said apparatus.

2. Detection apparatus as defined in claim 1 and wherein:
    said sensing means comprises an array including a plurality of magnetic field sensors in side-by-side relation in a row transverse to said course; and said scanner means comprises timing means and sampling means responsive thereto for sequentially sampling said analog signals to provide a series of analog signal samples.

3. Detection apparatus as defined in claim 1 and wherein:

said sensing means comprises a boom having a proximal end pivoted to said vehicle and a distal end adapted to swing in an arc ahead of said vehicle, and a magnetic field sensor mounted on said distal end; and said scanner means comprises oscillating drive means, coupled to said boom, for moving said boom and sensor in a scanning motion through a predetermined angle.

4. Detection apparatus as defined in claim 1, and wherein:

said display means comprises a multiple clor cathode ray tube having orthogonal deflection means responsive to said first and second deflection signals, and responsive to said first and second polarity analog signals to generator a visual display in first and second colors, respectively, proportional in intensity to magnitudes of said analog signals.

5. Detection apparatus as defined in claim 4, and wherein:

said sensing means comprises an array including a plurality of magnetic field sensors in side-by-side relaion in a row transverse to said course; and said scanner means comprises timing means and sampling means responsive thereto for sequentially sampling said analog signals to provide a series of analog signal samples.

6. Detection apparatus as defined in claim 4, and wherein:

said sensing means comprises a boom having a proximal end pivoted to said vehicle and a distal end adapted to swing in an arc ahead of said vehicle, and a magnetic field sensor mounted on said distal end; and said scanner means comprises oscillating drive means, coupled to said boom for moving said boom and sensor in a scanning motion through a predetermined angle.

7. Detection apparatus as defined in claim 5, and wherein:

sad first deflection signal generator comprises voltge ramp generator means, coupled to a wheel of said vehicle, for providing a frame determining vertical deflection signal proportional to the rotation of said wheel.

8. Detection apparatus as defined in claim 7, and wherein:

said second deflection signal generator comprises a sawtooth waveform generator, responsive to said timing means, to provide a line frequency determining horizontal deflection signal synchronized with the scanning rate of said sampling means.

9. Detection apparatus as defined in claim 6, and wherein:

said first deflection signal generator comprises a first potentiometer energized by a first voltage source and coupled to a wheel of said vehicle for providing a first voltage proportional to rotation of said wheel, a second potentiometer having a center tap and energized between said center tap and each of its end points by a second voltage which is the sum of said first voltage and a third voltage from a second voltage source, said second potentiometer being coupled to said scanner means so as to provide a vertical deflection signal that represents a vector sum of motion of said vehicle and the arcuate movement of said sensor.

10. Detection apparatus as defined in claim 9, and wherein:

said scond deflection generator comprises a third potentiometer coupled to said scanner so as to provide a line frequency determining horizontal deflection signal synchronized with the scanning movement of said sensor.

* * * * *